US012619568B2

(12) United States Patent
Mugunda et al.

(10) Patent No.: US 12,619,568 B2
(45) Date of Patent: May 5, 2026

(54) MULTI-INTERFACE/PROTOCOL COMPONENT MANAGEMENT SYSTEM

(71) Applicant: Dell Products L.P., Round Rock, TX (US)

(72) Inventors: Chandrasekhar Mugunda, Austin, TX (US); Rui An, Austin, TX (US); Shivabasava Karibasappa Komaranalli, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 22 days.

(21) Appl. No.: 18/744,982

(22) Filed: Jun. 17, 2024

(65) Prior Publication Data

US 2025/0384008 A1     Dec. 18, 2025

(51) Int. Cl.
*G06F 13/42* (2006.01)

(52) U.S. Cl.
CPC ...... *G06F 13/4221* (2013.01); *G06F 13/4282* (2013.01); *G06F 2213/0016* (2013.01); *G06F 2213/0026* (2013.01)

(58) Field of Classification Search
CPC ............. G06F 13/4221; G06F 13/4282; G06F 2213/0016; G06F 2213/0026
USPC ................ 710/2, 8, 11, 16, 33, 62, 105, 315
See application file for complete search history.

(56) References Cited

U.S. PATENT DOCUMENTS

| | | | | |
|---|---|---|---|---|
| 2011/0023031 A1* | 1/2011 | Bonola | ................... | G06F 21/10 |
| | | | | 718/1 |
| 2016/0062433 A1* | 3/2016 | York | ....................... | G06F 1/266 |
| | | | | 713/310 |
| 2016/0127167 A1* | 5/2016 | Chou | ................... | H04L 41/0226 |
| | | | | 709/223 |
| 2019/0004901 A1* | 1/2019 | Ryan | ..................... | G06F 1/3253 |
| 2020/0065283 A1* | 2/2020 | Jayaraman | .......... | G06F 13/4282 |
| 2020/0092256 A1* | 3/2020 | Hansen | ................... | H04L 41/28 |
| 2020/0356380 A1* | 11/2020 | Kelly | .................... | G06F 9/4403 |
| 2021/0297330 A1* | 9/2021 | Li | ............................ | H04L 41/28 |
| 2022/0414045 A1* | 12/2022 | Yang | ................. | G06F 13/4282 |
| 2024/0143305 A1* | 5/2024 | Gupta | ................. | G06F 11/3051 |

* cited by examiner

*Primary Examiner* — Idriss N Alrobaye
*Assistant Examiner* — Henry W Yu
(74) *Attorney, Agent, or Firm* — Joseph Mencher

(57) ABSTRACT
A multi-interface/protocol component management system includes a BMC device coupled to each of a plurality of components by one of its plurality of communication interfaces. The BMC device identifies a subset of the components that communicate via a first transport protocol, retrieves protocol/communication interface information from each of the subset of the components that identifies a messaging protocol used by that component and the communication interface that couples that component to the BMC device, and transmits a respective management command for each of the subset of the components using the first transport protocol, the messaging protocol used by that component, and the communication interface coupled to that component. The BMC device then receives management data from each of the subset of the components in response to transmitting the respective management commands, and manages the subset of the components using the management data.

20 Claims, 11 Drawing Sheets

BMC DEVICE IDENTIFIES 1ST SUBSET OF COMPONENTS THAT COMMUNICATE VIA 1ST TRANSPORT PROTOCOL, AND 2ND SUBSET OF COMPONENTS THAT COMMUNICATE VIA 2ND TRANSPORT PROTOCOL
302

BMC DEVICE RETRIEVES PROTOCOL/COMMUNICATION INTERFACE INFORMATION FROM 1ST SUBSET OF COMPONENTS
304

A

MULTI-INTERFACE/PROTOCOL COMPONENT MANAGEMENT SYSTEM

BACKGROUND

The present disclosure relates generally to information handling systems, and more particularly to managing components in an information handling system that utilize multiple interfaces and protocols.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and other computing devices known in the art, include components that must be managed, and such management is typically enabled by a Baseboard Management Controller (BMC) such as the integrated DELL® Remote Access Controller (iDRAC) provided in server devices available from DELL® Inc. of Round Rock, Texas, United States. However, as the number of different components provided in server devices increases, the management of such components raises issues.

For example, Artificial Intelligence/Machine Learning (AI/ML) server platforms may include any of a variety of multi-Graphics Processing Unit (GPU) systems that are continually increasing the number of components that must be managed by the BMC. Such multi-GPU systems may include GPU components, Network Interface Controller (NIC) components, Field Programmable Gate Array (FPGA) components, re-timer components, and/or other multi-GPU system components that would be apparent to one of skill in the art, and those multi-GPU system components may be connected to the BMC via different interfaces (e.g., Peripheral Component Interconnect express (PCIe) interfaces, Inter-Integrated Circuit (I2C) interfaces, etc.) and may require communication via different messaging protocols (e.g. the Platform Level Data Model (PLDM) protocol, the Non-Volatile Memory express-Management Interface (NVMe-MI) protocol, the Network Controller-Side Band (NC-SI) protocol, the System Management Bus Post Box Interface (SMBPBI) protocol, etc.) and/or transport protocols (e.g., the Management Control Transport Protocol (MCTP), the I2C protocol, etc.) in order to read thermal sensors in those components and/or perform other management operations known in the art.

While BMCs include various populator subsystems (e.g., proprietary populators like "PLDMPop" and "PuPop" utilized in the iDRAC discussed above) that are configured to facilitate thermal control, device health monitoring, telemetry data retrieval, and/or other management operations with particular components, such conventional populator subsystems are not scalable as they are customized for particular interfaces and protocols. As such, conventional BMC devices using conventional populator subsystems may experience issues when interacting with different components that communicate via different interfaces and protocols, particularly as new interfaces and/or protocols are introduced in the future.

Accordingly, it would be desirable to provide a multi-interface/protocol component management system that addresses the issues discussed above.

SUMMARY

According to one embodiment, an Information Handling System (IHS) includes a Baseboard Management Controller (BMC) processing system; and a BMC memory system that is coupled to the BMC processing system and that includes instructions that, when executed by the BMC processing system, cause the BMC processing system to provide a BMC engine that is configured to: identify a first subset of a plurality of components that are coupled to the BMC processing system and that communicate via a first transport protocol; retrieve, from each of the first subset of the plurality of components, protocol/communication interface information that identifies one of a plurality of first messaging protocols used by that component and the one of a plurality of communication interfaces that couples that component to the BMC processing system; transmit a respective first management command for each of the first subset of the plurality of components using the first transport protocol, the one of the plurality of first messaging protocols identified by the protocol/communication interface information retrieved for that component, and the one of the plurality of communication interfaces identified by the protocol/communication interface information retrieved for that component; receive, in response to transmitting the respective first management commands, first management data from each of the first subset of the plurality of components; and manage, using the first management data, the first subset of the plurality of components.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
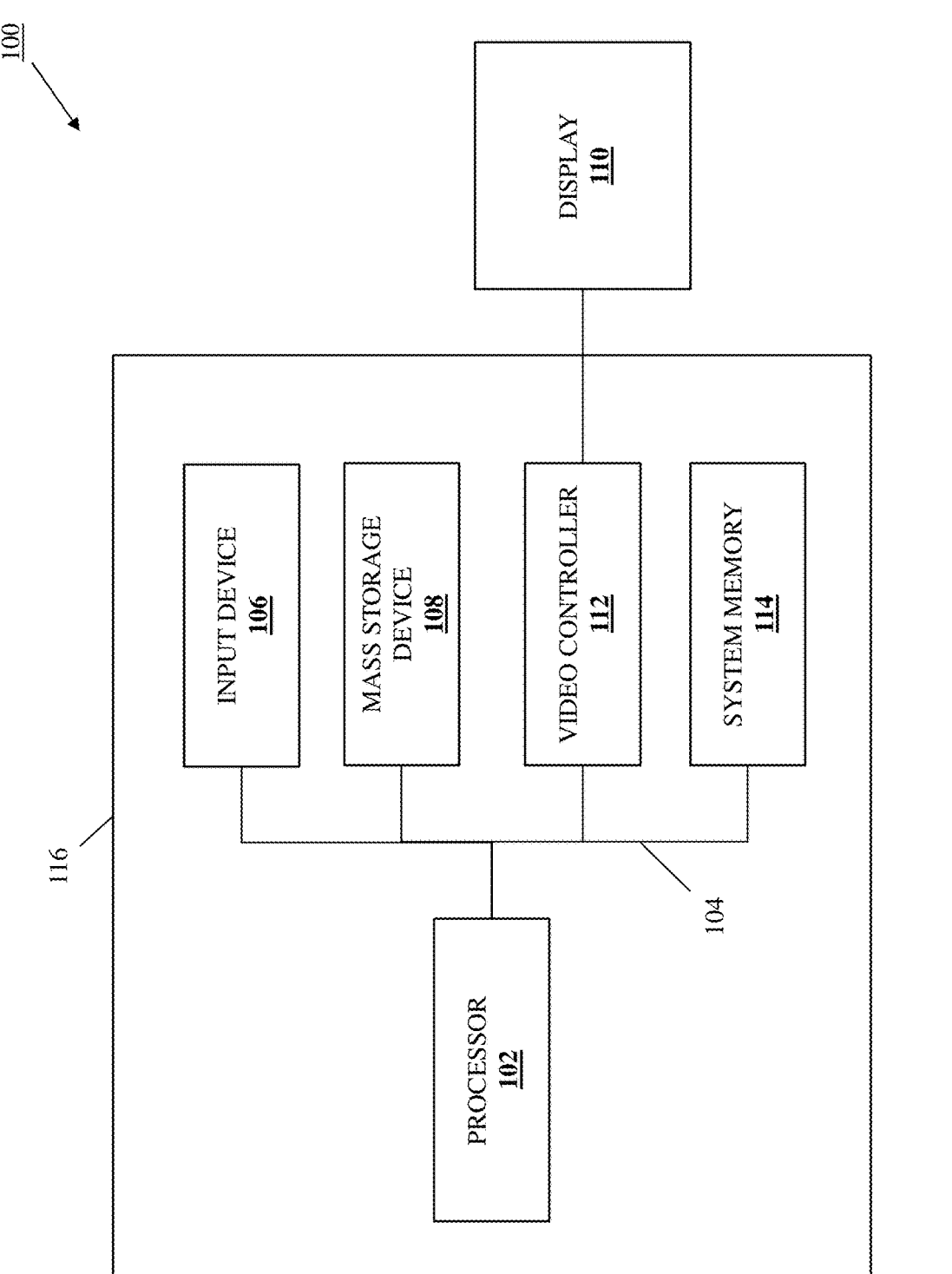
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
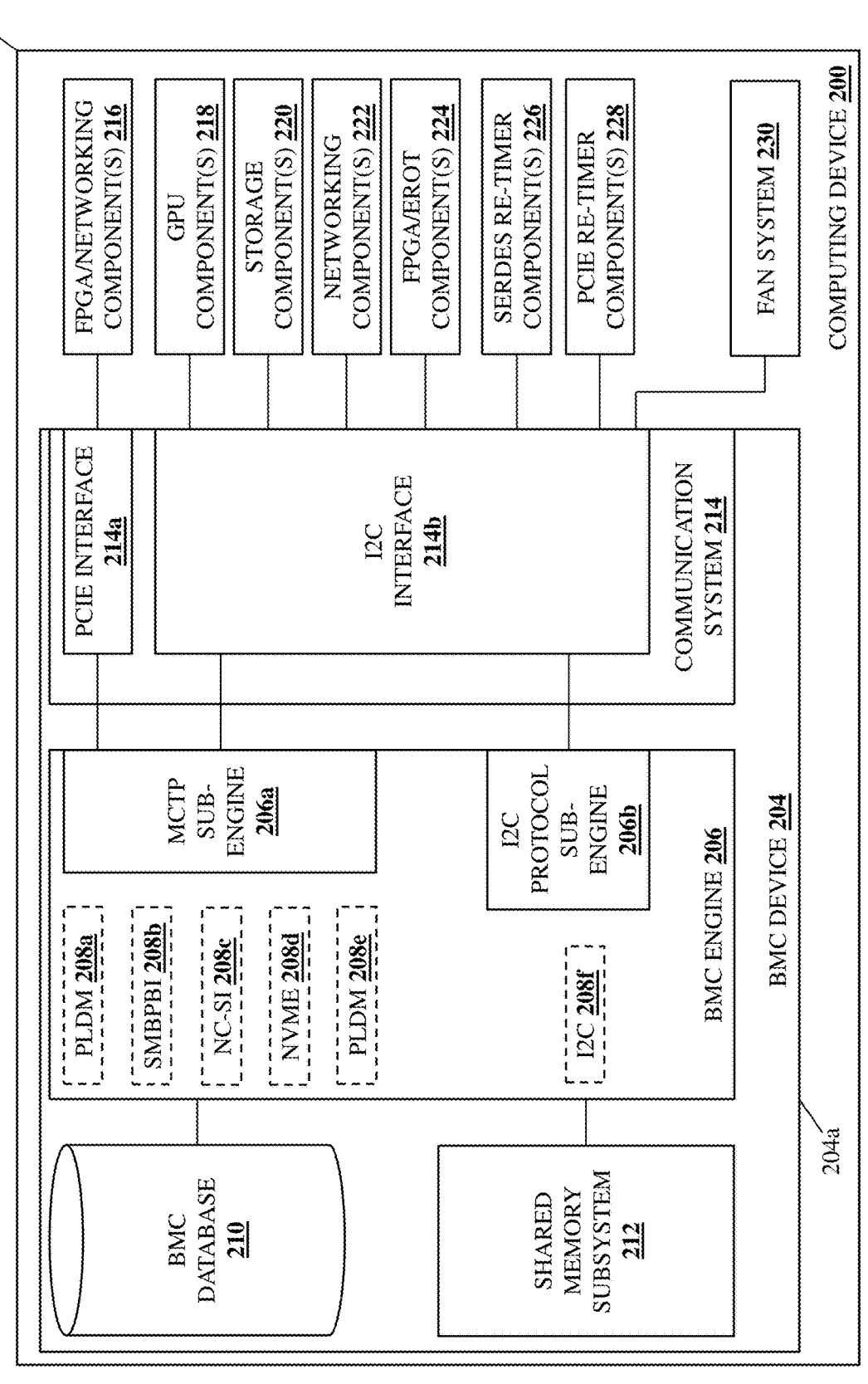
FIG. 2 is a schematic view illustrating an embodiment of a computing device that includes the multi-interface/protocol component management system of the present disclosure.

Referring now to FIG. 2, an embodiment of a computing device 200 is illustrated that may include the multi-interface/protocol component management system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 300 discussed below may be provided by other computing devices that are configured to operate similarly as the computing device 200 discussed below.

In the illustrated embodiment, the computing device 200 includes a chassis 202 that houses the components of the computing device 200, only some of which are illustrated and described below. As illustrated, the chassis 202 may house a BMC device 204 that may be provided by the integrated DELL® Remote Access Controller (iDRAC) provided in server devices available from DELL® Inc. of Round Rock, Texas, United States, and/or other BMC devices that would be apparent to one of skill in the art in possession of the present disclosure. As such, the BMC device 204 may be configured to provide an out-of-band management platform that includes mostly separate resources from the computing device 200 that are configured to provide a browser-based interface or Command Line Interface (CLI) for managing and monitoring components in the computing device 200.

In an embodiment, the BMC device 204 may include a chassis 204a (e.g., a circuit board) that supports the components of the BMC device 204, only some of which are illustrated and described below. For example, the chassis 204a may support a BMC processing system (not illustrated, but which may be similar to the processor 102 discussed above with reference to FIG. 1) and a BMC memory system (not illustrated, but which may be similar to the memory 114 discussed above with reference to FIG. 1) that is coupled to the BMC processing system and that includes instructions that, when executed by the BMC processing system, cause the BMC processing system to provide a BMC engine 206 that is configured to perform the functionality of the BMC engines and/or BMC devices discussed below.

In some embodiments, the BMC engine 206 may be configured using Application Programming Interface(s) (API(s)) to perform the component discovery operations, protocol/communication interface information retrieval operations, component communication operations, and/or any other BMC engine functionality described below. In the specific example illustrated and described below, the BMC engine 206 is also configured with transport protocol sub-engines that include a Management Control Transport Protocol sub-engine 206a that utilizes the MCTP, and an Inter-Integrated Circuit (I2C) protocol sub-engine 206b that utilizes the I2C protocol. However, while two specific transport protocols are illustrated and described below, one of skill in the art in possession of the present disclosure will appreciate how the BMC engine 206 may be configured to utilize any number and/or any type of transport protocols while remaining within the scope of the present disclosure as well.

In the specific examples illustrated and described below, the BMC engine 206 is also configured with messaging protocols that include a Platform Level Data Model (PLDM) messaging protocol 208a that is configured for use with the MCTP sub-engine 206a and PCIe interfaces in the embodiments described below, a System Management Bus Post Box Interface (SMBPBI) messaging protocol 208b that is configured for use with the MTCP sub-engine 206a and I2C interfaces in the embodiments described below, a Network Controller-Sideband Interface (NC-SI) messaging protocol 208c that is configured for use with the MTCP sub-engine 206a and I2C interfaces in the embodiments described below, a Non-Volatile Memory express (NVMe) messaging protocol 208d that is configured for use with the MTCP sub-engine 206a and I2C interfaces in the embodiments described below, a PLDM messaging protocol 208c that is configured for use with the MTCP sub-engine 206a and I2C interfaces in the embodiments described below, and an I2C messaging protocol 208f that is configured for use with the I2C protocol sub-engine 206b and I2C interfaces in the embodiments described below.

The chassis 204a of the BMC device 204 may also support a BMC storage system (not illustrated, but which may be similar to the storage 108 discussed above with reference to FIG. 1) that is coupled to the BMC engine 206 (e.g., via a coupling between the BMC storage system and the BMC processing system) and that includes a BMC database 210 that is configured to store any of the information utilized by the BMC engine 206 discussed below. The chassis 204a of the BMC device 204 may also support a shared memory subsystem 212 that is coupled to the BMC engine 206, and while illustrated and described as separate from the BMC engine 206, one of skill in the art in possession of the present disclosure will appreciate how the shared memory subsystem 212 may be provided by a portion of the BMC memory system that is used for the BMC engine 206 as described above while remaining within the scope of the present disclosure as well.

The chassis 204a of the BMC device 204 may also support communication system 214 that is coupled to the BMC engine 206 (e.g., via a coupling between the communication system 214 and the BMC processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. In the specific examples illustrated and described below, the communication system 214 includes a plurality of communications interfaces provide by a Peripheral Component Interconnect express (PCIe) interface 214a and an I2C interface 214b, but one of skill in the art in possession of the present disclosure will appreciate how the communication system 212 may include any number and/or any types of communication interfaces while remaining within the scope of the present disclosure as well.

The chassis 202 of the computing device 200 may also house a plurality of managed computing components that, in the embodiments illustrated and described below, are provided by a plurality of computing components that may be included on a multi-GPU system (e.g., the SXM5 H100 GPU/accelerator system available from NVIDIA® corporation of Santa Clara, California, United States) that is housed in the chassis 202, but one of skill in the art in possession of the present disclosure will appreciate how any number and/or types of computing components may be housed in the chassis in any configuration while remaining within the scope of the present disclosure as well.

As such, the computing device 200 in the examples illustrated and described below includes one or more Field Programmable Gate Array (FPGA)/networking components 216 (e.g., FPGA/NIC device(s)) coupled to the PCIe interface 214a in the communication system 214 of the BMC device 204, one or more GPU components 218 coupled to the I2C interface 214b in the communication system 214 of the BMC device 204, one or more storage components 220 coupled to the I2C interface 214b in the communication system 214 of the BMC device 204, one or more networking components 222 (e.g., NIC device(s)) coupled to the I2C interface 214b in the communication system 214 of the BMC device 204, one or more FPGA/Extended Root Of Trust (EROT) components 224 coupled to the I2C interface 214b in the communication system 214 of the BMC device 204, one or more SERializer/DESerializer (SERDES) re-timer components 226 coupled to the I2C interface 214b in the communication system 214 of the BMC device 204, and one or more PCIe re-timer components 228 coupled to the I2C interface 214b in the communication system 214 of the BMC device 204.

Furthermore, in the illustrated embodiments, the chassis 202 houses a fan system 230 that is coupled to the I2C interface 214b in the communication system 214 of the BMC device 204, and that one of skill in the art in possession of the present disclosure will appreciate is provided to describe an example of the use of the management data retrieved from the managed computing components according to the teachings of the present disclosure. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the multi-interface/protocol component management functionality discussed below, while remaining within the scope of the present disclosure as well.

Figure 3A:
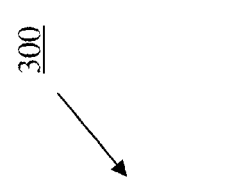
FIG. 3A is a flow chart illustrating an embodiment of a portion of a method for managing components that use multiple interfaces and protocols.
Figure 3A:
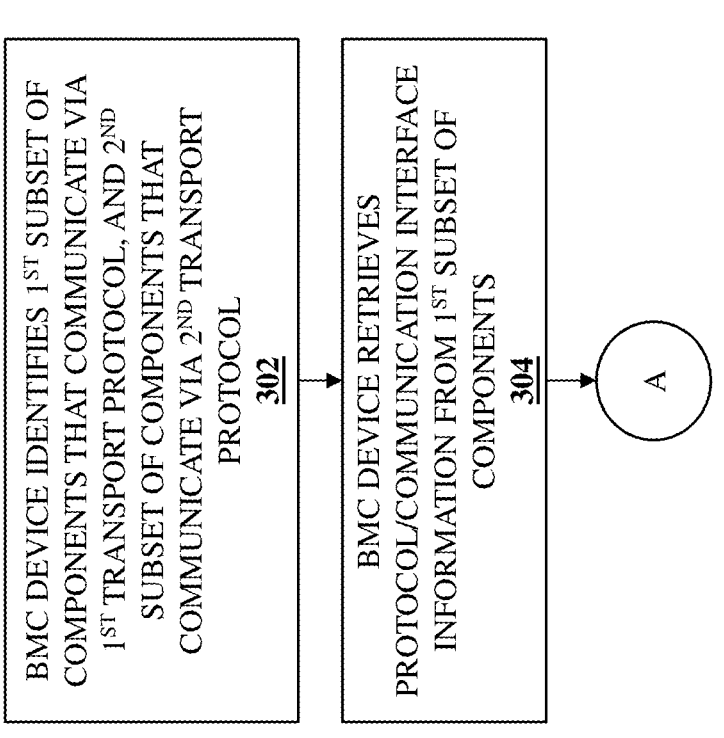
Figure 3A:
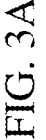
Figure 3B:
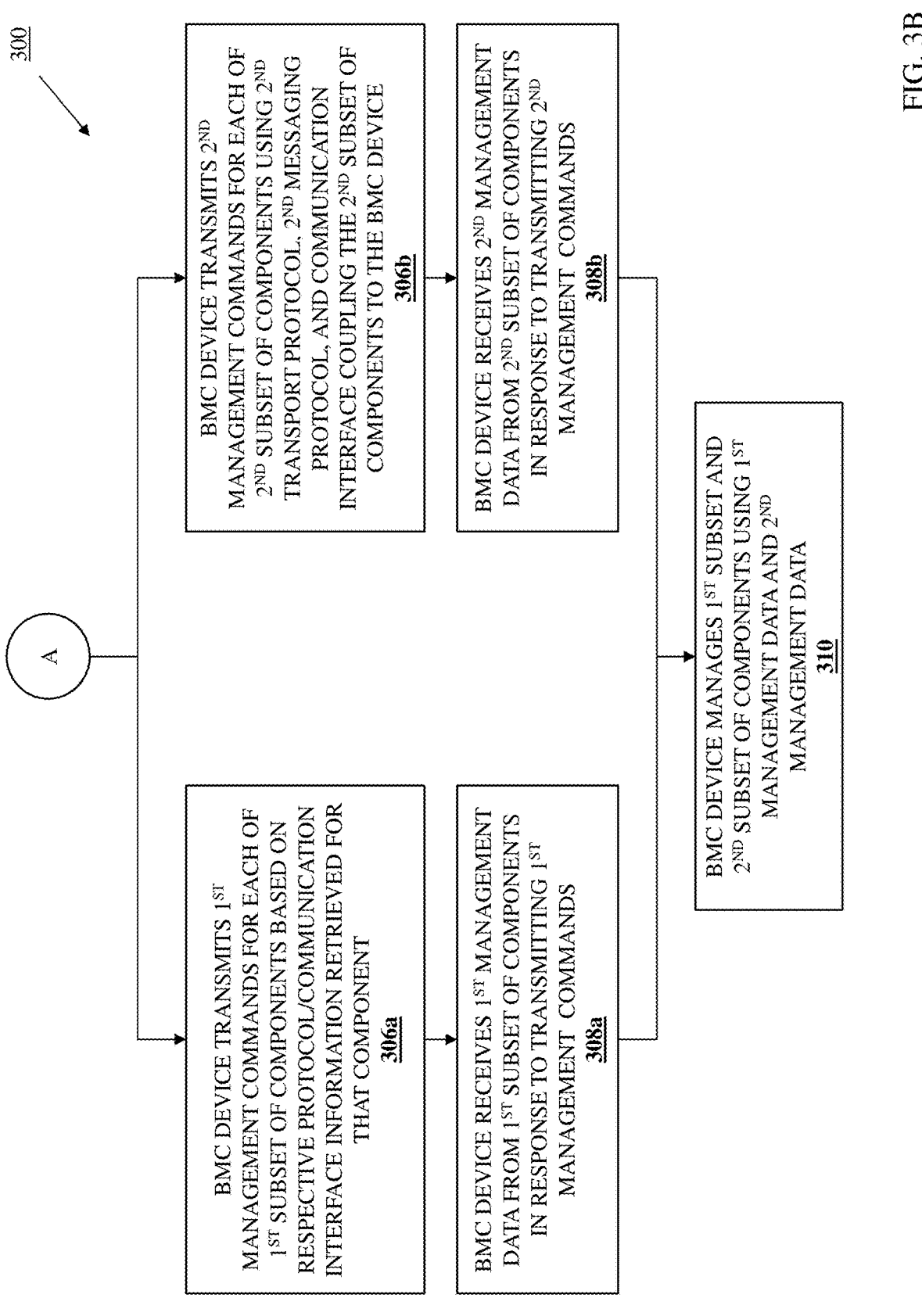
FIG. 3B is a flow chart illustrating an embodiment of a portion of a method for managing components that use multiple interfaces and protocols.

Referring now to FIGS. 3A and 3B, an embodiment of a method 300 for managing components that use multiple interfaces and protocols is illustrated. As discussed below, the systems and methods of the present disclosure provide for the identification of connected components that communicate via a transport protocol using different messaging protocols and/or communication interfaces, and then retrieve respective protocol/communication interface information from each of those components that details the messaging protocol and communication interface used by each of those components, and use it to generate management commands for each of those component to retrieve management data from each of those components. For example, the multi-interface/protocol component management system of the present disclosure may include a BMC device coupled to each of a plurality of components by one of its plurality of communication interfaces. The BMC device identifies a subset of the components that communicate via a first transport protocol, retrieves protocol/communication interface information from each of the subset of the components that identifies a messaging protocol used by that component and the communication interface that couples that component to the BMC device, and transmits a respective management command for each of the subset of the components using the first transport protocol, the messaging protocol used by that component, and the communication interface coupled to that component. The BMC device then receives management data from each of the subset of the components in response to transmitting the respective management commands, and manages the subset of the components using the management data. As such, a scalable component management system is provided that allows for the management of components that use any of a variety of different protocols and/or communication interfaces to communicate.

Figure 4A:
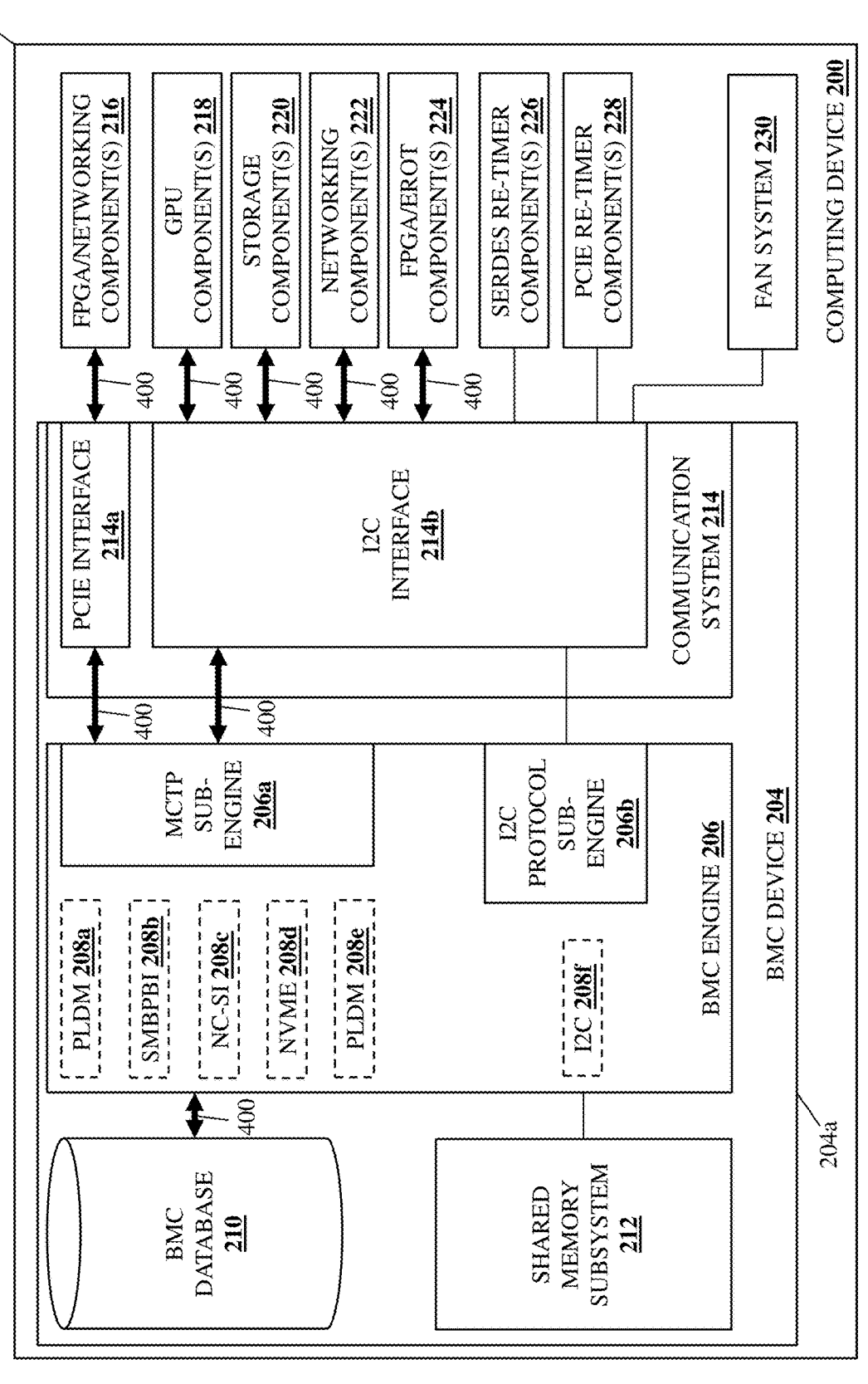
FIG. 4A is a schematic view illustrating an embodiment of the computing device of FIG. 2 operating during the method of FIG. 3.

The method 300 begins at block 302 where a BMC device identifies a first subset of components that communicate via a first transport protocol, and a second subset of components that communicate via a second transport protocol. With reference to FIG. 4A, in an embodiment of block 302, the BMC engine 206 in the BMC device 204 of the computing device 200 may perform first transport protocol component identification operations 400 that include retrieving topology information from the BMC database 210, and using that topology information and the MCTP sub-engine 206a to identify, via the MCTP (the first transport protocol in this example) and the PCI interface 214a and the I2C interface 214b in its communication system 214, the FPGA/networking component(s) 216, the GPU component(s) 218, the storage component(s) 220, the networking component(s) 222, and the FPGA/EROT component(s) 224, and one of skill in the art in possession of the present disclosure will appreciate how the first transport protocol component identification operations 400 may include any discovery operations that are configured to identify components like those described above.

Figure 4B:
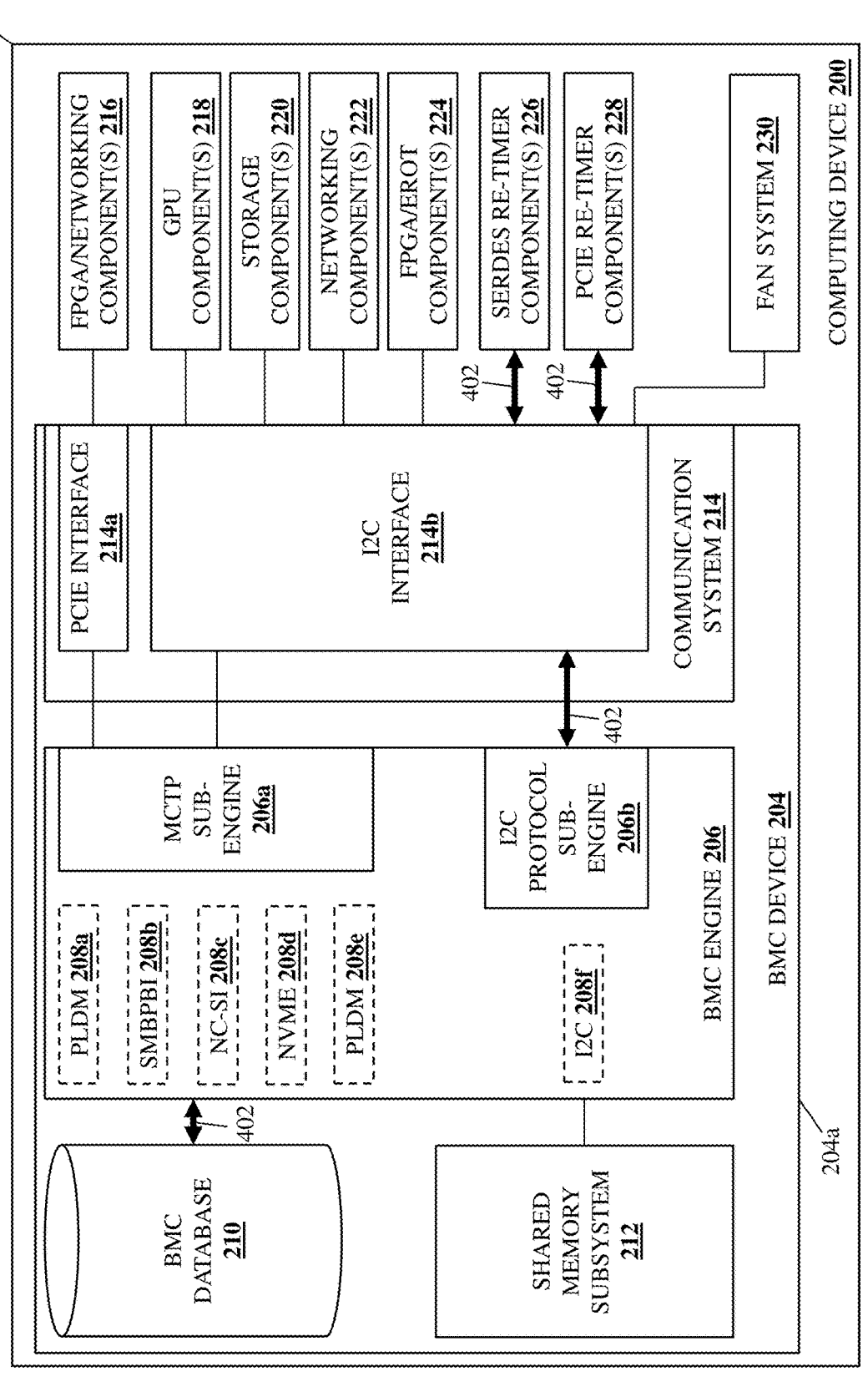
FIG. 4B is a schematic view illustrating an embodiment of the computing device of FIG. 2 operating during the method of FIG. 3.

With reference to FIG. 4B, in an embodiment of block 302, the BMC engine 206 in the BMC device 204 of the computing device 200 may also perform second transport protocol component identification operations 402 that include retrieving topology information from the BMC database 210, and using that topology information and the I2C protocol sub-engine 206b to identify, via the I2C protocol (the second transport protocol in this example) and the I2C interface 214b in its communication system 214, the SERDES re-timer component(s) 226 and the PCIe re-timer component(s) 228, and one of skill in the art in possession of the present disclosure will appreciate how the second transport protocol component identification operations 402 may include any discovery operations that are configured to identify components like those described above.

In a specific example, the topology information retrieved from the BMC database 210 may be I2C topology information that was pre-programmed in the BMC device 204 (i.e., prior to the method 300) and may identify communication buses (e.g., virtual bus numbers for the PCIe buses and I2C buses in the illustrated example), and that topology information may be utilized by the BMC engine 206 during the first transport protocol component identification operations 400 and the second transport protocol component identification operations 402 to determine whether components are connected to those communication buses (i.e., whether components are connected to a respective communication bus corresponding to each of the virtual bus numbers discussed above) by, for example, transmitting a discovery communication via that communication bus and determining whether a response is received.

As such, the BMC engine 206 may retrieve responses from the FPGA/networking component(s) 216, the GPU component(s) 218, the storage component(s) 220, the networking component(s) 222, and the FPGA/EROT component(s) 224 as part of the first transport protocol component identification operations 400, and thus may identify those components as using the first transport protocol (i.e., the MCTP in this example). In response to identifying the components that use the first transport protocol (i.e., the MCTP in this example), the BMC engine 206 may generate and associate a respective component identifier (e.g., an Endpoint IDentifier (EID)) for each of those components with the virtual bus number in the BMC database 210 that was used to discover that component. Similarly, the BMC engine 206 may retrieve responses from the SERDES re-timer component(s) 226 and the PCIe re-timer component(s) 228 as part of the second transport protocol component identification operations 402 and thus may identify those components as using the second transport protocol (i.e., the I2C protocol in this example).

As will be appreciated by one of skill in the art in possession of the present disclosure, in the illustrated embodiments provided below the topology information in the BMC database 210 may be I2C topology information, and that I2C topology information that is associated with components that are connected to the I2C interface 214b and that utilize the I2C messaging protocol 208f and the I2C transport protocol (i.e., the SERDES re-timer component(s) 226 and the PCIe re-timer component(s) 228 in this example) provides all the information needed to communicate with those components via I2C, and thus there is no need for component identifiers (e.g., Endpoint IDentifiers (EID(s))) like those provided in the BMC database 210 for the components that do not communicate via the I2C messaging protocol and I2C transport protocol using the I2C interface 214b. However, while the identification of specific components via specific transport protocols has been illustrated and described, one of skill in the art in possession of the present disclosure will appreciate how any components may be identified via any number and/or types of transport protocols while remaining within the scope of the present disclosure as well.

Figure 5:
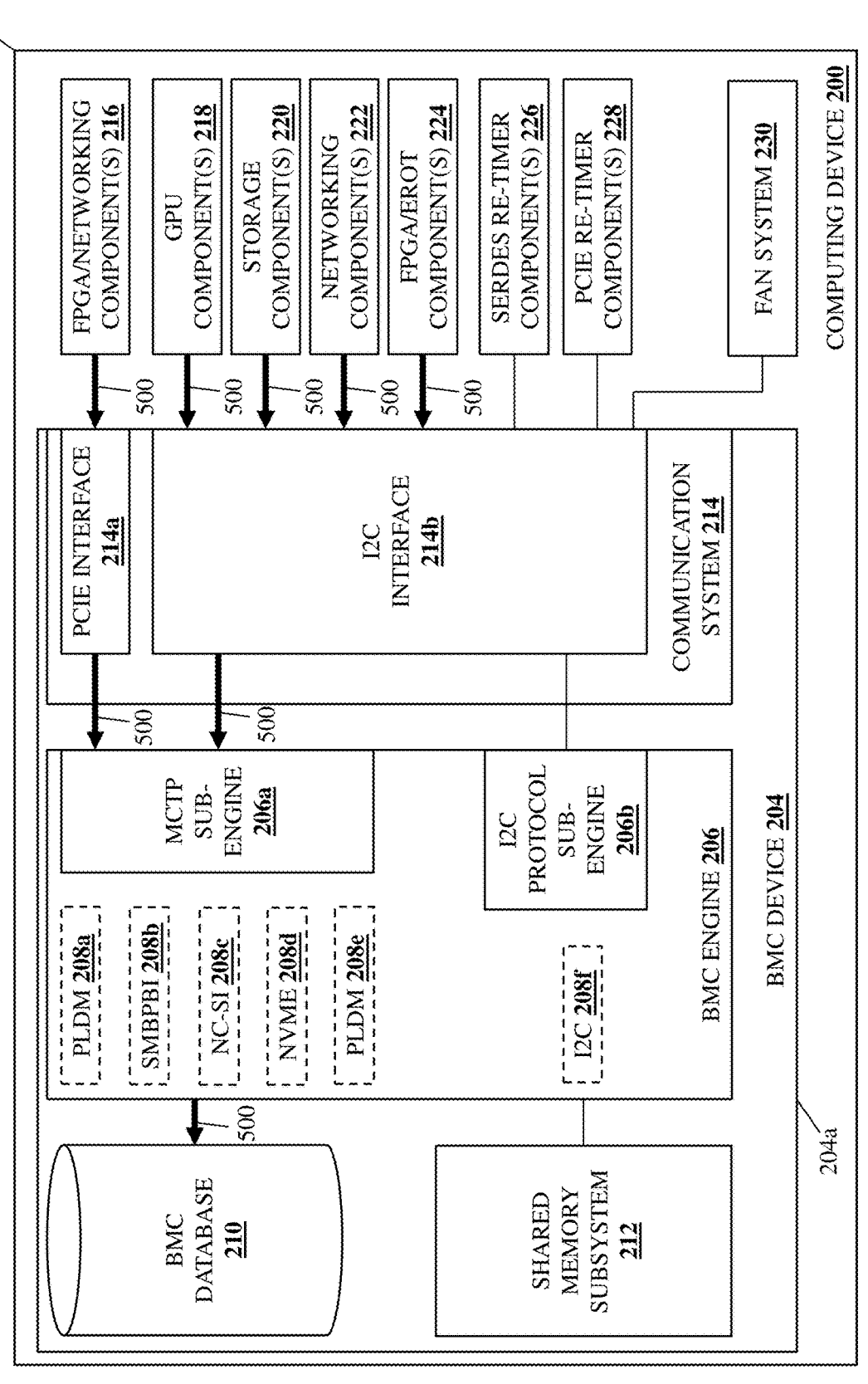
FIG. 5 is a schematic view illustrating an embodiment of the computing device of FIG. 2 operating during the method of FIG. 3.

The method 300 then proceeds to block 304 where the BMC device retrieves protocol/communication interface information from the first subset of components. With reference to FIG. 5, in an embodiment of block 304, the BMC engine 206 in the BMC device 204 of the computing device 200 may perform protocol/communication interface information retrieval operations 500 that include using the MCTP sub-engine 206a to retrieve, via the PCI interface 214a and the I2C interface 214b in its communication system 214, protocol/communication interface information from each of the FPGA/networking component(s) 216, the GPU component(s) 218, the storage component(s) 220, the networking component(s) 222, and the FPGA/EROT component(s) 224 that were identified at block 402 via the first transport protocol (e.g., the MCTP in this example), and storing that protocol/communication interface information in its BMC database 210. For example, the BMC engine 206 may be configured using an API to perform the protocol/communication interface information retrieval operations 500 on components discovered using the MCTP in order to retrieve respective protocol/communication interface information for each of those components, as well as to associate that protocol/communication interface information with the component identifier (e.g., the EID) for that component in the BMC database 210.

As will be appreciated by one of skill in the art in possession of the present disclosure, the simplified embodiments provided herein describe components in a computing device that only use two different transport protocols, with protocol/communication interface information retrieved from components that utilize the first transport protocol and different messaging protocols and/or communication interfaces, while no protocol/communication interface information is needed from the components that use the second transport protocol and also use the same messaging protocol and the same communication interface. However, one of skill in the art in possession of the present disclosure will appreciate how the teachings of the present disclosure may be applied to computing devices with components that use any additional transport protocol with different messaging protocols and/or communication interfaces (e.g., similar to the components that use the first transport protocol (e.g., the MCTP) as described herein), and/or components that use any additional transport protocol with the same messaging protocol and communication interface (e.g., similar to the components that use the second transport protocol (e.g., the I2C protocol) as described herein), while remaining within the scope of the present disclosure as well.

Following block 304, the method 300 may proceed to block 306a and 308a for the components that utilize the first transport protocol with different messaging protocols and/or communication interfaces, as well as blocks 306b and 308b for the components that use the second transport protocol and also use the same messaging protocol and the same communication interface. At blocks 306a and 308a, the BMC device may transmit first management commands for each of the first subset of components based on the respective protocol/communication interface information retrieved for that component and, in response, may receive first management data from the first subset of components. For example, the BMC engine 206 in the BMC device 204 of the computing device 200 may be configured using an API to perform first transport protocol (e.g., MCTP)-discovered device operations at blocks 306a and 308a as described below.

Figure 6A:
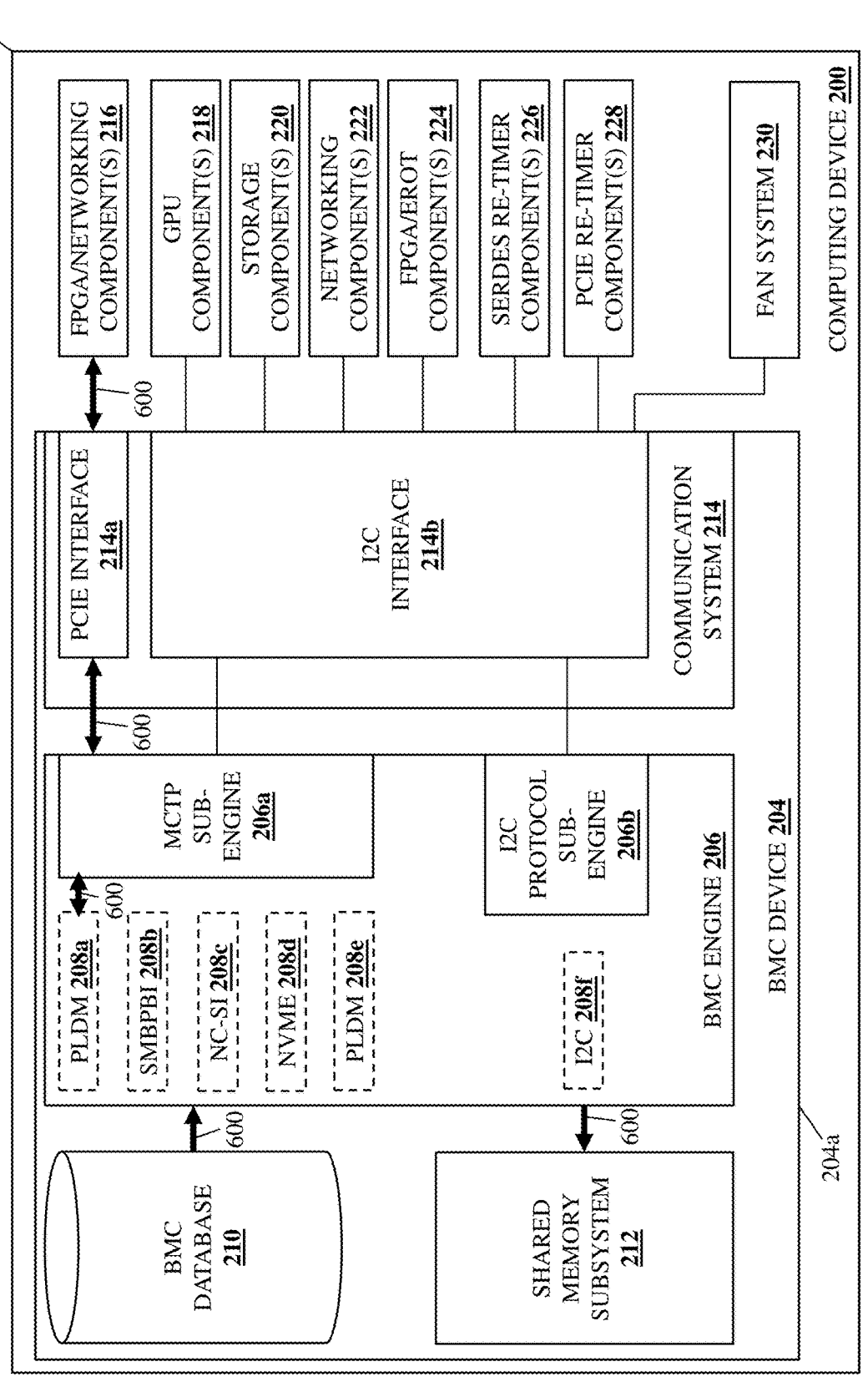
FIG. 6A is a schematic view illustrating an embodiment of the computing device of FIG. 2 operating during the method of FIG. 3.

With reference to FIG. 6A, in an embodiment of blocks 306a and 308a, the BMC engine 206 in the BMC device 204 of the computing device 200 may perform management data retrieval operations 600 that may include retrieving the protocol/communication information stored in the BMC database 210 for each of the FPGA/networking component(s) 216 and using it to generate a respective management command for the each of the FPGA/networking component(s) 216 that, in this example, is configured for transmission using the PLDM messaging protocol 208a and the MCTP and via the PCIe interface 214a in its communication system 214 (e.g., a management command for an FPGA/networking component 216 that will be transmitted using PLDM/MCTP over PCIe). The BMC engine 206 may then use the PLDM messaging protocol 208a, the MCTP sub-engine 206a, and the PCIe interface 214a to transmit those management commands to each of the FPGA/networking component(s) 216. In response to transmitting the management commands, the management data retrieval operations 600 may also include receiving back respective management data from each of the FPGA/networking component(s) 216 and storing that management data in the shared memory subsystem 212. In the specific examples provided below, the management data includes thermal data provided by thermal sensors in the FPGA/networking component(s) 216, but one of skill in the art in possession of the present disclosure will appreciate how any management data may be retrieved from components at block 308a while remaining within the scope of the present disclosure.

Figure 6B:
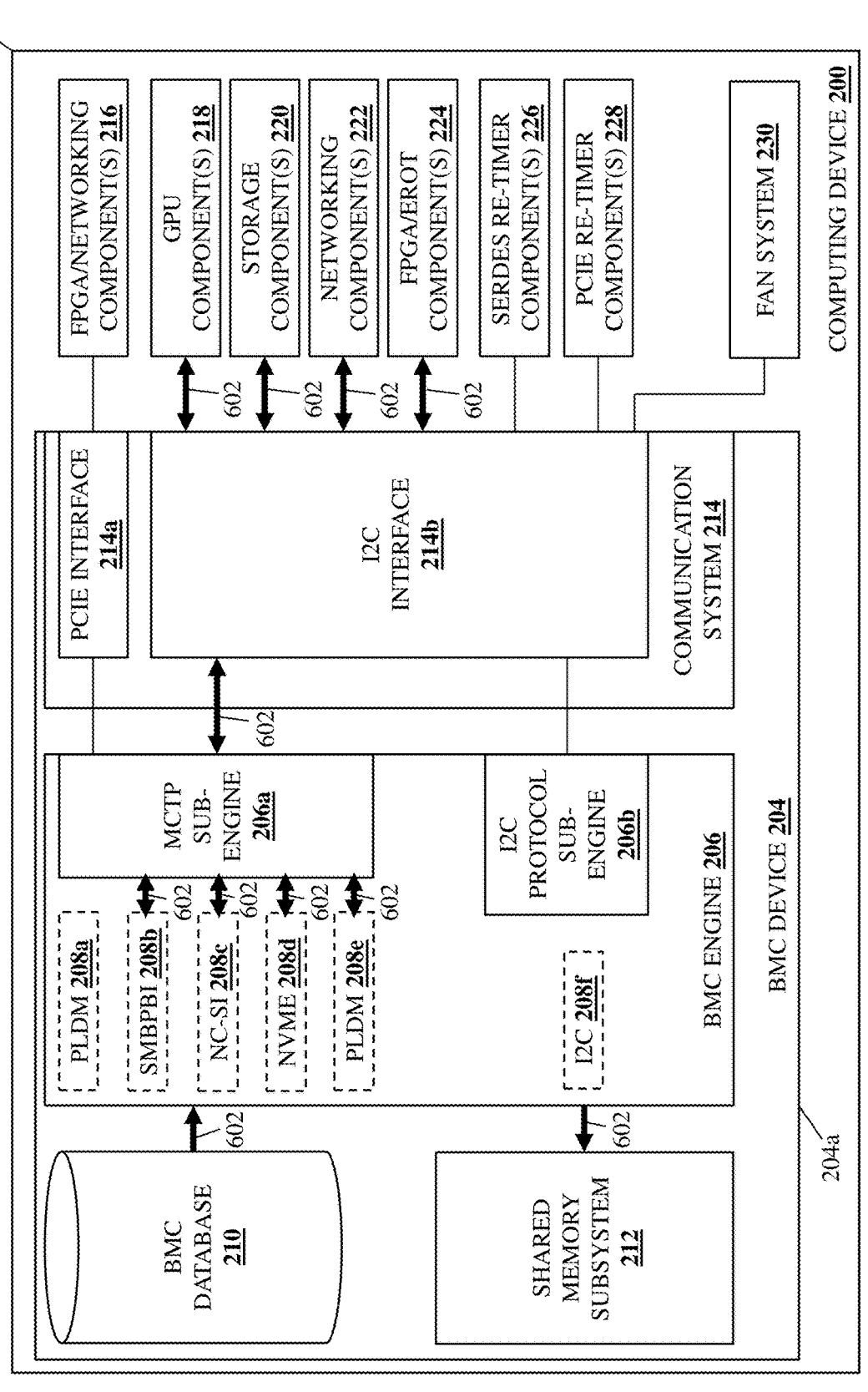
FIG. 6B is a schematic view illustrating an embodiment of the computing device of FIG. 2 operating during the method of FIG. 3.

With reference to FIG. 6B, in an embodiment of blocks 306a and 308a, the BMC engine 206 in the BMC device 204 of the computing device 200 may also perform management data retrieval operations 602 that may include retrieving the protocol/communication information stored in the BMC database 210 for each of the GPU component(s) 218, the storage component(s) 220, the networking component(s) 222, and the FPGA/EROT component(s) 224, and using it to generate a respective management command for the each of the GPU component(s) 218, the storage component(s) 220, the networking component(s) 222, and the FPGA/EROT component(s) 224 that, in this example, is configured for transmission using one of the messaging protocols available in the BMC engine 206 (i.e., the SMBPBI messaging protocol 208b, the NC-SI messaging protocol 208c, the NVMe messaging protocol 208d, or the PLDM messaging protocol 208c) and the MCTP, and via the I2C interface 214b in its communication system 214 (e.g., a management command for a GPU component 218, a storage component 220, a networking component 222 or a FPGA/EROT component 224 that will be transmitted using PLDM/MCTP over I2C, NVMe/MCTP over I2C, SMBPBI/MCTP over I2C, or NC-SI/MCTP over I2C).

The BMC engine 206 may then use the one of the messaging protocols available in the BMC engine 206 (i.e., the SMBPBI messaging protocol 208b, the NC-SI messaging protocol 208c, the NVMe messaging protocol 208d, or the PLDM messaging protocol 208c), the MCTP sub-engine 206a, and the I2C interface 214b to transmit each of those management commands to the one of the GPU component(s) 218, the storage component(s) 220, the networking component(s) 222, or the FPGA/EROT component(s) 224 for which it was generated. In response to transmitting the management commands, the management data retrieval operations 602 may also include receiving back respective management data from each of the GPU component(s) 218, the storage component(s) 220, the networking component(s) 222, and the FPGA/EROT component(s) 224, and then storing that management data in the shared memory subsystem 212. In the specific examples provided below, the management data includes thermal data provided by thermal sensors in the GPU component(s) 218, the storage component(s) 220, the networking component(s) 222, and the FPGA/EROT component(s) 224, but one of skill in the art in possession of the present disclosure will appreciate how any management data may be retrieved from components at block 308a while remaining within the scope of the present disclosure.

At blocks 306b and 308b, the BMC device may transmit second management commands for each of the second subset of components using the second transport protocol, a second messaging protocol, and the communication interface coupling the second subset of components to the BMC device and, in response, may receive second management data from the second subset of components. For example, the BMC engine 206 in the BMC device 204 of the computing device 200 may be configured using an API to perform second transport protocol (e.g., non-MCTP)-discovered device operations that are performed at blocks 306b and 308b as described below.

Figure 7:
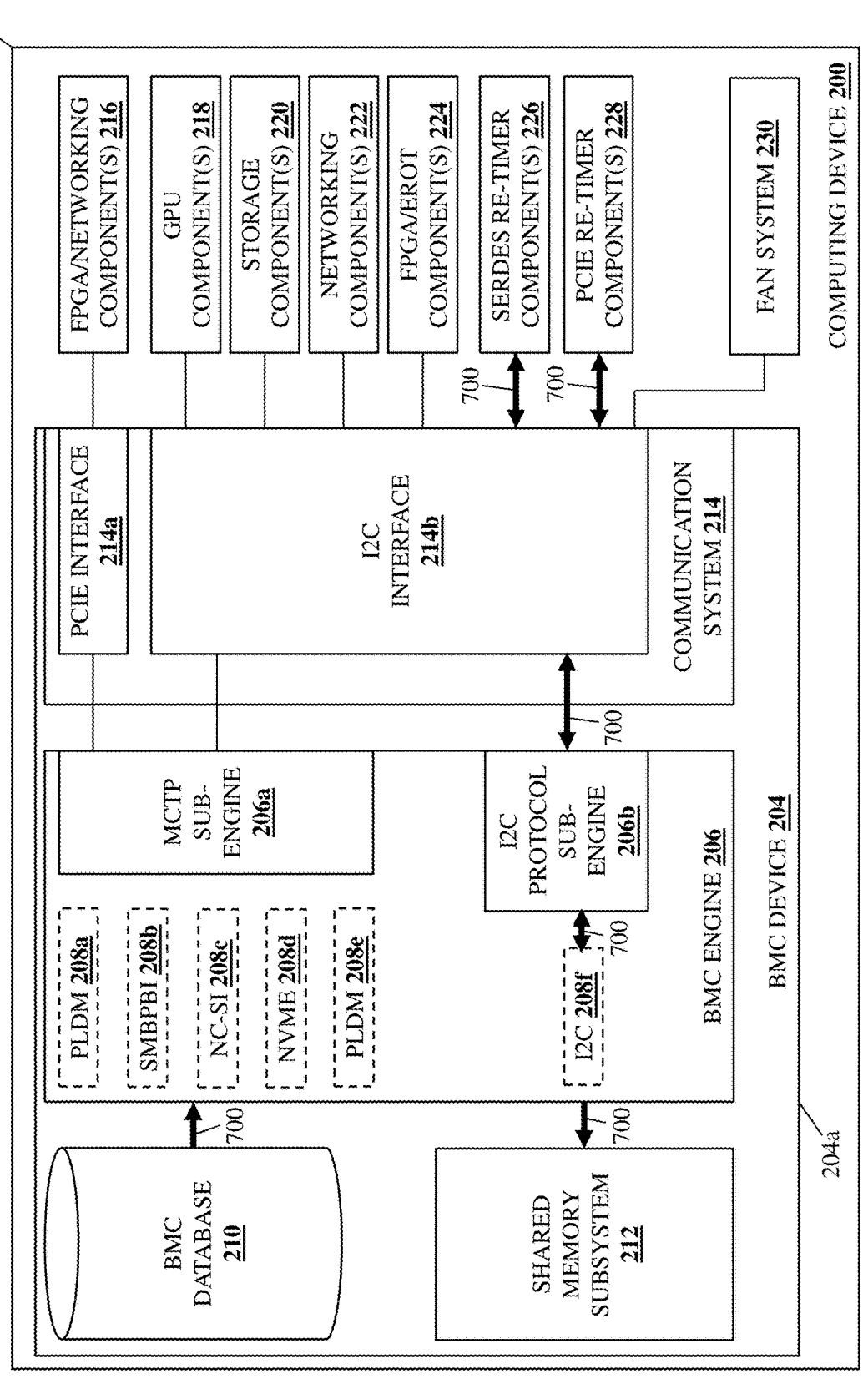
FIG. 7 is a schematic view illustrating an embodiment of the computing device of FIG. 2 operating during the method of FIG. 3.

With reference to FIG. 7, in an embodiment of blocks 306b and 308b, the BMC engine 206 in the BMC device 204 of the computing device 200 may perform management data retrieval operations 700 that may include accessing the topology information (e.g., I2C topology information in this example) stored in the BMC database 210 for each of the SERDES re-timer component(s) 226 and PCIe re-timer component(s) 228, and using it to generate a respective management command for the each of the SERDES re-timer component(s) 226 and PCIe re-timer component(s) 228 that is configured for transmission using the I2C messaging protocol 208f and the I2C transport protocol and via the I2C interface 214*b* in its communication system 214 (e.g., a management command such as a I2C polling command transmitted using I2C). The BMC engine 206 may then use the I2C messaging protocol 208*f*, the I2C sub-engine 206*b*, and the I2C interface 214*b* to transmit those management commands to each of the SERDES re-timer component(s) 226 and PCIe re-timer component(s) 228. In response to transmitting the management commands, the management data retrieval operations 700 may also include receiving back respective management data from each of the SERDES re-timer component(s) 226 and PCIe re-timer component(s) 228, and storing that management data in the shared memory subsystem 212. In the specific examples provided below, the management data includes thermal data provided by thermal sensors in the SERDES re-timer component(s) 226 and PCIe re-timer component(s) 228, but one of skill in the art in possession of the present disclosure will appreciate how any management data may be retrieved from components at block 308*b* while remaining within the scope of the present disclosure.

Figure 8:
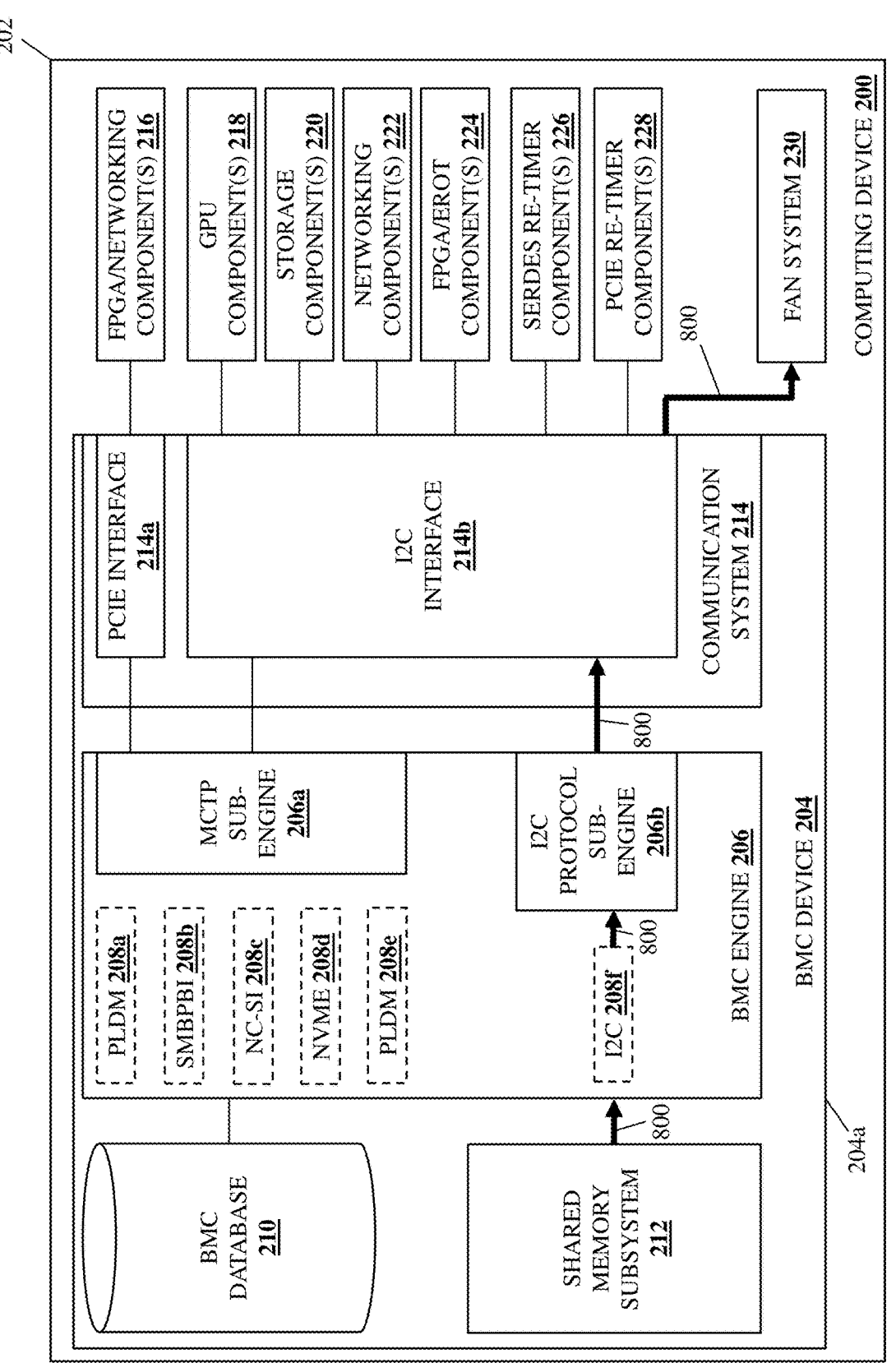
FIG. 8 is a schematic view illustrating an embodiment of the computing device of FIG. 2 operating during the method of FIG. 3.

Following block 308*a* and 308*b*, the method 400 may proceed to block 310 where the BMC device manages the first subset and the second subset of components using the first management data and the second management data. With reference to FIG. 8, in an embodiment of block 310, the BMC engine 206 may perform management data utilization operations 800 that, in the specific example illustrated in FIG. 8, includes a thermal daemon or other management subsystem provided by the BMC engine 206 retrieving the management data that was stored in the shared memory subsystem 212 at blocks 308*a* and 308*b*, and using the I2C messaging protocol 208*f*, the I2C protocol sub-engine 206*b*, and the I2C interface 214*b* in its communication system 214 to control the fan system 230 in order to cool any or each of the FPGA/networking component(s) 216, the GPU component(s) 218, the storage component(s) 220, the networking component(s) 222, and the FPGA/EROT component(s) 224, the SERDES re-timer component(s) 226, and/or the PCIe re-timer component(s) 228. However, while a particular messaging protocol, transport protocol, and communication interface are described as being used to control the fan system 230, one of skill in the art in possession of the present disclosure will appreciate how the fan system 230 may be controlled using other messaging protocols, transport protocols, and/or communication interfaces while remaining within the scope of the present disclosure as well.

Furthermore, while a specific use by a thermal daemon in the BMC engine 206 of the management data retrieved according to the teachings of the present disclosure has been described, one of skill in the art in possession of the present disclosure will appreciate how other management data collected according to the teachings of the present disclosure may be utilized in other manners that will fall within the scope of the present disclosure as well. For example, a PLDM daemon in the BMC engine 206 may utilize such management data at block 310 for a variety of PLDM management operations known in the art, a data manager daemon in the BMC engine 206 may utilize such management data at block 310 for a variety of data management operations known in the art, a power daemon in the BMC engine 206 may utilize such management data at block 310 for a variety of power management operations known in the art, a Graphical User Interface (GUI) daemon in the BMC engine 206 may utilize such management data at block 310 for a variety of GUI management operations known in the art, etc. Furthermore, one of skill in the art in possession of the present disclosure will appreciate how the BMC engine 206 may be configured to transmit any management data collected according to the teachings of the present disclosure via a network (e.g., a management network) and to a management device as well.

Thus, systems and methods have been described that provide for the identification of connected components that communicate via a transport protocol using different messaging protocols and/or communication interfaces, and then retrieve respective protocol/communication interface information from each of those components that details the messaging protocol and communication interface used by each of those components, and use it to generate management commands for each of those component to retrieve management data from each of those components. For example, the multi-interface/protocol component management system of the present disclosure may include a BMC device coupled to each of a plurality of components by one of its plurality of communication interfaces. The BMC device identifies a subset of the components that communicate via a first transport protocol, retrieves protocol/communication interface information from each of the subset of the components that identifies a messaging protocol used by that component and the communication interface that couples that component to the BMC device, and transmits a respective management command for each of the subset of the components using the first transport protocol, the messaging protocol used by that component, and the communication interface coupled to that component. The BMC device then receives management data from each of the subset of the components in response to transmitting the respective management commands, and manages the subset of the components using the management data. As such, a scalable component management system is provided that allows for the management of components that use any of a variety of different protocols and/or communication interfaces to communicate.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-interface/protocol component management system, comprising:

a plurality of components; and a Baseboard Management Controller (BMC) device that includes a plurality of communication interfaces and that is coupled to each of the plurality of components by one of the plurality of communication interfaces, where the BMC device is configured to:

discover a first subset of the plurality of components that utilize communication protocols and one or more of the plurality of communication interfaces that have not been identified to the BMC device;

determine, as part of the discovery of the first subset of the plurality of components, that the first subset of the plurality of components communicate via a first transport protocol;

retrieve, from each of the first subset of the plurality of components using the first transport protocol, protocol/communication interface information that identifies one of a plurality of first messaging protocols used by that component and the one of the plurality of communication interfaces that couples that component to the BMC device;

transmit a respective first management command for each of the first subset of the plurality of components using the first transport protocol, the one of the plurality of first messaging protocols identified by the protocol/communication interface information retrieved for that component, and the one of the plurality of communication interfaces identified by the protocol/communication interface information retrieved for that component;

receive, in response to transmitting the respective first management commands, first management data from each of the first subset of the plurality of components; and manage, using the first management data, the first subset of the plurality of components.

2. The system of claim 1, where the BMC device is configured to:

discover a second subset of the plurality of components that utilize communication protocols and one or more of the plurality of communication interfaces that have not been identified to the BMC device;

determine, as part of the discovery of second first subset of the plurality of components, that the second subset of the plurality of components communicate via a second transport protocol that is different than the first transport protocol;

transmit a respective second management command for each of the second subset of the plurality of components using the second transport protocol, a second messaging protocol that is different than the plurality of first messaging protocols, and the one of the plurality of communication interfaces that couples that component to the BMC device;

receive, in response to transmitting the respective second management commands, second management data from each of the second subset of the plurality of components; and manage, using the second management data, the second subset of the plurality of components.

3. The system of claim 2, wherein the first transport protocol is a Management Component Transport Protocol (MCTP), and the second transport protocol is an Inter-Integrated Circuit (I2C) protocol.

4. The system of claim 2, wherein the plurality of first messaging protocols include at least one of a Platform Level Data Model (PLDM) protocol, a System Management Bus Post Box Interface (SMBPBI) protocol, a Network Controller-Sideband Interface (NC-SI) protocol, and a Non-Volatile Memory express (NVMe) protocol, and wherein the second messaging protocol includes an Inter-Integrated Circuit (I2C) protocol.

5. The system of claim 1, wherein the plurality of communication interfaces include a Peripheral Component Interconnect express (PCIe) interface and an Inter-Integrated Circuit (I2C) interface.

6. The system of claim 1, wherein the BMC device is configured to:

retrieve communication bus topology information that includes virtual bus identifiers;

use the virtual bus numbers in the communication bus topology information to discover the first subset of the plurality of components;

generate, for each of the first subset of the plurality of components, a respective component identifier; and associate, for each of the first subset of the plurality of components, the protocol/communication interface information for that component with the component identifier generated for that component.

7. An Information Handling System (IHS), comprising:

a Baseboard Management Controller (BMC) processing system; and a BMC memory system that is coupled to the BMC processing system and that includes instructions that, when executed by the BMC processing system, cause the BMC processing system to provide a BMC engine that is configured to:

discover a first subset of a plurality of components that are coupled to the BMC processing system and that utilize communication protocols and one or more of the plurality of communication interfaces that have not been identified to the BMC engine;

determine, as part of the discovery of the first subset of the plurality of components, that the first subset of the plurality of components communicate via a first transport protocol;

retrieve, from each of the first subset of the plurality of components using the first transport protocol, protocol/communication interface information that identifies one of a plurality of first messaging protocols used by that component and the one of a plurality of communication interfaces that couples that component to the BMC processing system;

transmit a respective first management command for each of the first subset of the plurality of components using the first transport protocol, the one of the plurality of first messaging protocols identified by the protocol/communication interface information retrieved for that component, and the one of the plurality of communication interfaces identified by the protocol/communication interface information retrieved for that component;

receive, in response to transmitting the respective first management commands, first management data from each of the first subset of the plurality of components; and manage, using the first management data, the first subset of the plurality of components.

8. The IHS of claim 7, where the BMC engine is configured to:

discover a second subset of the plurality of components that utilize communication protocols and one or more of the plurality of communication interfaces that have not been identified to the BMC engine;

determine, as part of the discovery of second first subset of the plurality of components, that the second subset of the plurality of components communicate via a second transport protocol that is different than the first transport protocol;

transmit a respective second management command for each of the second subset of the plurality of components using the second transport protocol, a second messaging protocol that is different than the plurality of first messaging protocols, and the one of the plurality of communication interfaces that couples that component to the BMC processing system;

receive, in response to transmitting the respective second management commands, second management data from each of the second subset of the plurality of components; and manage, using the second management data, the second subset of the plurality of components.

9. The IHS of claim 8, wherein the first transport protocol is a Management Component Transport Protocol (MCTP), and the second transport protocol is an Inter-Integrated Circuit (I2C) protocol.

10. The IHS of claim 8, wherein the plurality of first messaging protocols include at least one of a Platform Level Data Model (PLDM) protocol, a System Management Bus Post Box Interface (SMBPBI) protocol, a Network Controller-Sideband Interface (NC-SI) protocol, and a Non-Volatile Memory express (NVMe) protocol, and wherein the second messaging protocol includes an Inter-Integrated Circuit (I2C) protocol.

11. The IHS of claim 7, wherein the plurality of communication interfaces include a Peripheral Component Interconnect express (PCIe) interface and an Inter-Integrated Circuit (I2C) interface.

12. The IHS of claim 7, wherein the BMC engine is configured to:

retrieve communication bus topology information that includes virtual bus identifiers;

use the virtual bus numbers in the communication bus topology information to discover the first subset of the plurality of components;

generate, for each of the first subset of the plurality of components, a respective component identifier; and associate, for each of the first subset of the plurality of components, the protocol/communication interface information for that component with the component identifier generated for that component.

13. The IHS of claim 7, wherein the first management data includes thermal sensor data, and wherein the managing the first subset of the plurality of components using the first management data includes using the thermal sensor data to control a fan system.

14. A method for managing components that use multiple interfaces and protocols, comprising:

discovering, by a Baseboard Management Controller (BMC) device, a first subset of a plurality of components that are coupled to the BMC device and that utilize communication protocols and one or more of the plurality of communication interfaces that have not been identified to the BMC device;

determining, by the BMC device as part of the discovery of the first subset of the plurality of components, that the first subset of the plurality of components communicate via a first transport protocol;

retrieving, by the BMC device from each of the first subset of the plurality of components using the first transport protocol, protocol/communication interface information that identifies one of a plurality of first messaging protocols used by that component and the one of the plurality of communication interfaces that couples that component to the BMC device;

transmitting, by the BMC device, a respective first management command for each of the first subset of the plurality of components using the first transport protocol, the one of the plurality of first messaging protocols identified by the protocol/communication interface information retrieved for that component, and the one of the plurality of communication interfaces identified by the protocol/communication interface information retrieved for that component;

receiving, by the BMC device in response to transmitting the respective first management commands, first management data from each of the first subset of the plurality of components; and managing, by the BMC device using the first management data, the first subset of the plurality of components.

15. The method of claim 14, further comprising:

discovering, by the BMC device, a second subset of the plurality of components that utilize communication protocols and one or more of the plurality of communication interfaces that have not been identified to the BMC device;

determine, by the BMC device as part of the discovery of second first subset of the plurality of components, that the second subset of the plurality of components communicate via a second transport protocol that is different than the first transport protocol;

transmitting, by the BMC device, a respective second management command for each of the second subset of the plurality of components using the second transport protocol, a second messaging protocol that is different than the plurality of first messaging protocols, and the one of the plurality of communication interfaces that couples that component to the BMC device;

receiving, by the BMC device in response to transmitting the respective second management commands, second management data from each of the second subset of the plurality of components; and managing, by the BMC device using the second management data, the second subset of the plurality of components.

16. The method of claim 15, wherein the first transport protocol is a Management Component Transport Protocol (MCTP), and the second transport protocol is an Inter-Integrated Circuit (I2C) protocol.

17. The method of claim 15, wherein the plurality of first messaging protocols include at least one of a Platform Level Data Model (PLDM) protocol, a System Management Bus Post Box Interface (SMBPBI) protocol, a Network Controller-Sideband Interface (NC-SI) protocol, and a Non-Volatile Memory express (NVMe) protocol, and wherein the second messaging protocol includes an Inter-Integrated Circuit (I2C) protocol.

18. The method of claim 14, wherein the plurality of communication interfaces include a Peripheral Component Interconnect express (PCIe) interface and an Inter-Integrated Circuit (I2C) interface.

19. The method of claim 14, further comprising:

retrieving, by the BMC device, communication bus topology information that includes virtual bus identifiers;

using, by the BMC device, the virtual bus numbers in the communication bus topology information to discover the first subset of the plurality of components;

generating, by the BMC device for each of the first subset of the plurality of components, a respective component identifier; and associating, by the BMC device for each of the first subset of the plurality of components, the protocol/communication interface information for that component with the component identifier generated for that component.

20. The method of claim 14, wherein the first management data includes thermal sensor data, and wherein the managing the first subset of the plurality of components using the first management data includes using the thermal sensor data to control a fan system.

\* \* \* \* \*